US012770817B2

(12) United States Patent
Thering

(10) Patent No.: US 12,770,817 B2
(45) Date of Patent: Oct. 20, 2026

(54) FIBER OPTIC POWER FOR ADJUSTABLE MAGNET ASSEMBLIES

(71) Applicant: Cardinal CG Company, Eden Prairie, MN (US)

(72) Inventor: Kyle R. Thering, Avoca, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 18/819,981

(22) Filed: Aug. 29, 2024

(65) Prior Publication Data

US 2025/0079107 A1 Mar. 6, 2025

Related U.S. Application Data

(60) Provisional application No. 63/579,885, filed on Aug. 31, 2023.

(51) Int. Cl.
*H01J 25/50* (2006.01)
*H01J 23/02* (2006.01)
*H01J 23/34* (2006.01)

(52) U.S. Cl.
CPC .............. *H01J 25/50* (2013.01); *H01J 23/02* (2013.01); *H01J 23/34* (2013.01)

(58) Field of Classification Search
None
See application file for complete search history.

(56) References Cited

U.S. PATENT DOCUMENTS 6,265,100 B1 7/2001 Saaski et al.
7,941,022 B1 * 5/2011 Schaffner ............. H04B 10/807 398/171
10,153,725 B2 12/2018 Balakrishnan et al.
10,163,612 B2 12/2018 De Bosscher et al.
2008/0277565 A1 * 11/2008 Bookbinder ....... G02B 6/02047 250/206
2014/0246310 A1 9/2014 Crowley et al.
2014/0246312 A1 9/2014 Crowley et al.
2016/0225591 A1 8/2016 Crowley et al.
2017/0093501 A1 * 3/2017 Meitl ..................... H04B 10/11
2022/0028672 A1 1/2022 Polle et al.
2022/0360343 A1 11/2022 Suyama

OTHER PUBLICATIONS

Lizon et al., "Charging a Battery-Powered Device With a Fiber-Optically Connected Photonic Power System for Achieving High-Voltage Isolation" , 2008 IEEE International Power Modulators and High-Voltage Conference, Date of Conference May 2008, pp. 4.
Inaternational Searching Authority, "International Search Report and Written Opinion" , From Application No. PCT/US2024/044514, Mailed Nov. 20, 2024, pp. 14.

* cited by examiner

*Primary Examiner* — Kenneth B Wells
(74) *Attorney, Agent, or Firm* — Fredrikson & Byron, P.A.

(57) ABSTRACT

An apparatus, system and method for adjustable magnet assemblies that deliver power through fiber optics. An energy storage device that includes a rechargeable battery is located in a magnetron assembly and a fiber optic cable located outside the magnetron assembly delivers power signals to recharge the rechargeable battery.

14 Claims, 7 Drawing Sheets

FIBER OPTIC POWER FOR ADJUSTABLE MAGNET ASSEMBLIES

RELATED APPLICATIONS

This application claims priority to U.S. Provisional Patent Application No. 63/579,885, filed Aug. 31, 2023, the contents of which are incorporated herein by reference.

FIELD OF THE INVENTION

The present invention relates to apparatuses, systems, and methods for adjustable magnet assemblies that deliver power through fiber optics.

BACKGROUND OF THE INVENTION

Magnetron sputtering of rotating targets is well known and is used extensively for producing a wide variety of thin films on a wide variety of substrates. In the most basic form of rotating-target magnetron sputtering, the material to be sputtered (i.e., the target) is either formed in the shape of a tube or attached to the outer surface of a support tube, which is made of a rigid material and is rotated. A stationary magnetron assembly is disposed within the tube and supplied magnetic flux, which permeates the target such that there is adequate magnetic flux at the outer surface of the target. Such a magnetron assembly is directed at a substrate, within a vacuum chamber, producing and holding a plasma in a desired location for coating the target material onto the substrate. The magnetic field produced by the magnetron assembly is designed in such a way that it provides high plasma density adjacent the target so as to increase the probability that particles emitted from the target will have ionizing collisions with the working gas, hence enhancing the efficiency of the sputtering process.

Fabrication costs for targets of some materials, such as transparent conductive oxide (TCO) materials, are relatively high in comparison to the cost of the raw materials. To improve the economy of these targets, it may be desirable to increase the thickness of the target material. In this way, the target will have significantly more usable material while adding only minimally to the overall cost of the target, as the fabrication cost does not change substantially. The only significant cost increase is due to the additional raw material used. In addition, thicker targets have the added benefit of allowing longer production campaigns between target changes.

In the case of reactive magnetron sputtering, metallic targets are sputtered in an atmosphere that contains reactive gas, such as oxygen, nitrogen, or both. The sputtered material reacts with the reactive gas in order to form a film comprising a compound of the target material and the reactive gas. The reactive gas also reacts with the target surface, thereby forming reacted compound on the target surface. The surface compound may greatly reduce the ablation rate. In order to improve the sputtering efficiency, the amount of reactive gas can be carefully controlled so as to minimize the target surface reactions while still achieving the desired film chemistry. In some cases, it is desirable to control the process such that the chemistry of the film is sub-stoichiometric.

Fine control over process gas can make the process sensitive to small perturbations. The industry has seen considerable technological advances in power delivery and process gas control that have minimized many process perturbations. Nevertheless, there still may be variation in the magnetic confinement of the plasma. As the target erodes, for example, the working surface of the target material becomes closer to the magnet assembly and thus the magnetic field becomes stronger. This changes the confinement of the plasma, altering the dynamics of the sputtering process. This may present challenges to maintaining long-term stability of the process.

As previously stated, as the target erodes, the working surface of the target becomes closer to the magnet assembly, and the intensity of the magnetic field, at the working surface, may increase in a non-linear fashion. For finely controlled processes (e.g., when depositing optical thin films with tight uniformity requirements), it may be desirable to modify the magnetic field, as the target erodes, so as to minimize variability of the process, thereby making the process easier to control over the course of the target life.

As another example, it may be desirable to adjust the magnet assembly differently for different processes.

Devices having an adjustable magnetron assembly have been devised. These devices adjust the location of one or more magnets of the magnet assembly. This may be done, for example, to compensate for target erosion by changing the distance between a magnet and the target material. In some cases, the position of the magnet is adjusted to keep its distance from the working surface of the target more consistent. Additionally or alternatively, the position of one or more magnets may be adjusted to configure the magnet assembly differently for different processes. More generally, there may be various reasons for adjusting the position of one or more magnets of a magnet assembly.

In known adjustable magnet bar systems, such as those provided by Sputtering Components and Soleras Advanced Coatings, the power to move/adjust the magnet bars is provided either by an internal battery, which may or may not be rechargeable, or through a hard-wired connection into a magnet bar assembly. While known adjustable systems are advantageous, there is room for improvement or further developments.

Existing systems that include a battery in the magnetron assembly suffer from the issue that relatively frequent maintenance is required to replace and/or recharge the battery. In systems that require battery replacement, this is time consuming, as the sputtering chamber needs to be shut down and the magnetron assembly removed from the sputtering chamber and disassembled in order to replace the battery. In systems that include a rechargeable battery, similar issues may remain since they may require access to a recharging port often located on an exterior of the magnetron assembly. The maintenance of such systems can be time consuming and productivity can be significantly reduced by maintenance down-time.

Other systems use complicated mechanisms to recharge batteries, such as turbines located in the magnetron assembly that receive power from a flowing coolant fluid and generate power to recharge. Such systems may greatly complicate the construction of the magnetron assembly and may lead to system failures.

Other systems use hard wiring connections between the sputtering chamber and the cathode target in which the magnetron assembly is located. Such hard wiring connections can be troublesome in sputtering environments because of the rotation of parts and require connections in the wiring to accommodate such rotation. This may lead to complicated structures being used. Also, systems that use electrical metal contacts may experience corrosion due to the use of coolant fluids. Furthermore, hard wiring connections are susceptible to electronic noise issues.

It is desirable to provide online adjustment of a magnetic field (e.g., of magnetic field strength) in a sputtering apparatus during sputtering without the need for removing the magnetron assembly from the sputtering chamber to make the adjustment. It would also be desirable to provide a magnetron assembly that does not require substantial maintenance down time for recharging or replacing a battery. Additionally or alternatively, it would be desirable to facilitate powering an adjustable magnet assembly without the challenges noted above.

SUMMARY OF THE INVENTION

Figure 1:
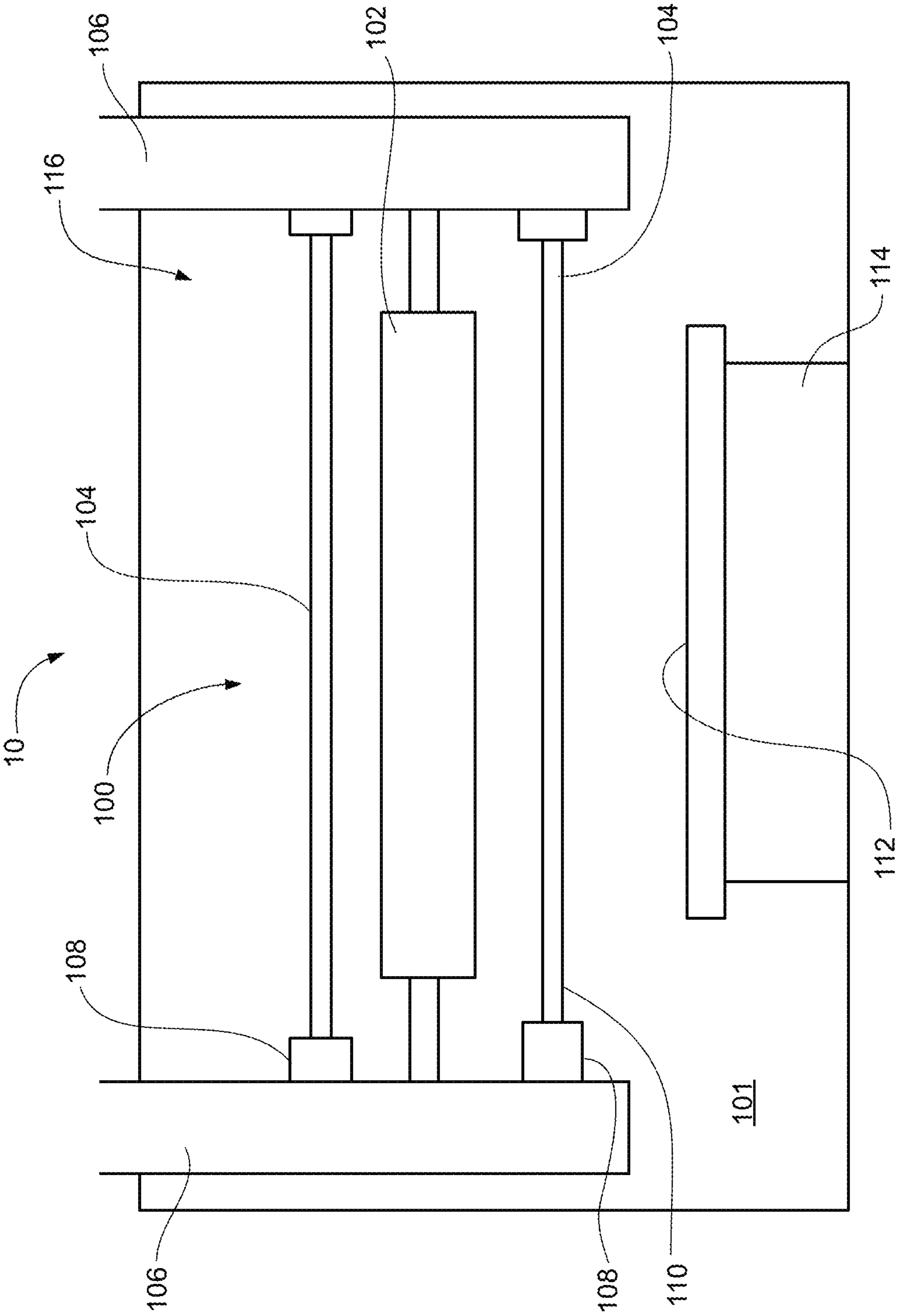
FIG. 1 is schematic cross-sectional view of a sputtering apparatus according to certain embodiments of the invention.

According to an embodiment of the invention, a magnetron assembly for a rotary target includes a plurality of magnets, a plurality of motors, a controller and energy storage device and a fiber optic cable. The plurality of motors are operatively coupled to the plurality of magnets and are configured to adjust positions of the plurality of magnets. The controller and energy storage device is in operative communication with the plurality of motors, and include an electronic controller and at least one rechargeable battery. The fiber optic cable is operatively coupled to the controller and energy storage device such that photon signals received by the fiber optic cable from outside the magnetron assembly are converted to electrical signals and delivered to the controller and energy storage device wherein the electrical signals include power signals to recharge the rechargeable battery.

According to another embodiment of the invention, a method for displacing at least one of a plurality of magnets located in a magnetron assembly for sputtering is provided. The magnetron assembly includes a plurality of motors operatively coupled to the plurality of magnets, the plurality of motors are configured to adjust positions of the plurality of magnets, a controller and energy storage device is in operative communication with the plurality of motors, the controller and energy storage device including an electronic controller and at least one rechargeable battery, a fiber optic cable operatively coupled with the controller and energy storage device, the method comprising the steps of:

delivering photon signals from outside the magnetron to the fiber optic cable assembly and converting the photon signals to electrical signals delivered to the controller and energy storage device, wherein the photon signals include power signals; and recharging the rechargeable battery of the controller and energy storage device with the power signals.

According to another embodiment of the invention, there is provided a rotary cathode assembly for a magnetron sputtering apparatus. The rotary cathode assembly includes a magnetron assembly as described above and a rotary target, the rotary target being a hollow cylindrical target surrounding the magnetron assembly. The hollow cylindrical target is configured to be rotatably attached to the magnetron sputtering apparatus, and the magnetron assembly is configured to be stationarily attached to the magnetron sputtering apparatus, and the fiber optic cable of the magnetron assembly is optically coupled to a second fiber optic cable located outside the rotary cathode assembly, wherein the second fiber optic cable delivers photon signals to the fiber optic cable of the magnetron assembly.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

In the present specification, anywhere the terms "comprising" or "comprises" are used, those terms have their ordinary, open-ended meaning. In addition, the disclosure at each such location is to be understood to also disclose that it may, as an alternative, "consist essentially of" or "consist of."

In known adjustable magnet bar assemblies located inside a cylindrical sputtering target/cathode, the power to move/adjust the magnet bars is provided by a battery that may or may not be rechargeable or it is supplied by a hard-wired connection into the magnet bar assembly. When the adjustable magnet bar assembly is powered through a battery, whether rechargeable or not, the sputtering device needs to be shut down so that the rotatable target can be removed and the battery can be either replaced or recharged. This interrupts production and causes delays. When a hard-wired connection is used, a rotating connection needs to be provided because of the rotation of the target. Such rotating electrical connections can be unreliable. Also, there could be possible corrosion concerns with electrical metal contacts because of the use of coolant fluid as will be described in detail hereinafter.

Some embodiments of the invention provide a new system for powering adjustable magnet bars of a sputtering cathode. The system involves delivering fiber optic data signals and power signals to the adjustable magnetron assembly. In such a system, data and power signals are delivered through fiber optics in the form of photons. The data and power signals delivered via fiber optics into the interior of the cylindrical sputtering target/cathode are used for adjusting/moving the adjustable magnet bars and trickle charging a rechargeable battery located in the adjustable magnetron assembly.

The use of fiber optics provides many benefits especially in a vacuum sputtering environment. The power requirements to generate a plasma with rotating cathodes typically operate at voltages ranging from about 200 Volts to about 750 Volts and about 15 amps to about 250 amps that can be DC, pulsed DC, switched DC or AC currents. Most commonly, switched DC or AC currents are used. A benefit of utilizing an optical cable for power and communications is that the optical cable is immune to electromagnetic and radio frequency interference. The nature of the power requirements for cathodes used in a sputtering environment generates a lot of electromagnetic interference via electromagnetic induction, radiation, capacitive coupling or specifically with pulsed DC and switched DC generators high voltage transients.

The use of fiber optics also eliminates the need for rotating electrical connections between end blocks and the rotating target. As is conventional in a rotating target environment, end blocks have rotatable end block fixtures to which the target is mounted. Alternatively, the system may be used in a cantilevered apparatus where only one end of the target is coupled to an end block. An embodiment will be described that uses end blocks at each end of the target and magnetron assembly although the embodiments are not so limited. The magnetron assembly itself remains in a rotationally fixed position relative to the cylindrical sputtering target by being coupled to stationary end block fixtures of the end block, as is conventional and well known in the art. A fiber optic cable can extend through an interior of the magnetron assembly and have an end located adjacent to the stationary end block fixture. Another fiber optic cable can be brought into the sputtering chamber through the end block where it terminates in a stationary end block fixture to which the magnetron assembly (e.g., a magnet bar assembly) is mounted. A window or fiber optic coupler located in the stationary end block fixture allows the fiber optic cable located in the magnetron assembly and the fiber optical cable located in the end block to communicate with each other. Thus, the need to have a rotating electrical connection which, as previously stated, can be unreliable, is eliminated. The fiber optic power is preferably delivered to the magnetron assembly through only one of the two end blocks. In addition, the concern of corrosion from exposure to a cooling fluid used in the rotating target is eliminated. Corrosion with traditional copper cables can cause those cables to lose conductivity over time which directly correlates to the amount of power that can be delivered over that cable as well as decreasing the integrity of any communication signals over those copper cables as well. Since optical cables are typically made of plastic, or glass that is chemically inert, they are not susceptible to corrosion.

To minimize unproductive down time of the sputtering device, the magnetron assembly can include a photovoltaic cell located therein. The photovoltaic cell receives data and power signals from the fiber optic cable located outside the magnetron assembly. The photovoltaic cell converts the photons received into electrical signals, which can power and control various components in the magnetron assembly. For example, actuators used to adjust the positions of magnet bars may be powered and controlled by the signals received over the fiber optic cable. Other devices such as sensors may be powered and controlled by these signals as well. Because the amount of power may not be sufficient to drive motors and other devices, it may be used to trickle charge a battery located in a magnetron assembly and the battery is used to provide power to move the magnets.

Alternatively, a rechargeable battery may be located inside the target and the power signals from the fiber optic cable located outside the magnetron assembly are converted into electrical signals to trickle charge the rechargeable battery to keep it substantially in a full power state, or it can be used to periodically charge the battery. By providing a rechargeable battery that is charged by the photovoltaic cell, down time is significantly reduced for replacing or recharging the battery because the target does not need to be removed from the sputtering apparatus (at least not during the useful life of the rechargeable battery). The output power levels required to trickle charge the battery would range from about 2 volts DC to about 20 Volts DC with output current levels of about 250 mW to about 25 Watts. By using fiber optics, the optical power requirement to achieve such power levels is about 1 Watt to about 100 Watts FIG. 1 is a cross-sectional view of a portion of a sputtering apparatus 10 according to an embodiment of the claimed invention. The sputtering apparatus 10 includes a rotary cathode assembly 100 located in a sputtering chamber 101 that, when operational, is subject to a vacuum (as is well known to those of ordinary skill in the art) to create a vacuum chamber 116. The rotary cathode assembly 100 includes a magnetron assembly (e.g., a "magnet bar assembly") 102 encircled by a cylindrical sputtering target 104. An end block 106 is located at each end of the magnetron assembly 102 and sputtering target 104. As previously stated, the embodiments of the invention can be used with a cantilevered design sputtering apparatus and magnetron assembly, however, the embodiments described herein will be described in a system in which both ends of the target and magnetron assembly are supported. The sputtering target 104 rotates around the magnetron assembly 102, which remains stationary. Each end block 106 includes a rotating end block fixture 108 and a stationary end block fixture 110. The sputtering target 104 is detachably coupled to the rotating end block fixture 108. The magnetron assembly 102 is detachably coupled to the stationary end block fixture 110. By such a connection, the sputtering target 104 can rotate around the magnetron assembly 102 while the magnetron assembly 102 remains stationary. During sputtering, a substrate 112 is positioned below the sputtering target 104. Alternatively, the embodiments of the invention can be used in a sputtering apparatus that uses sputter-up or side sputtering technology. Preferably, the substrate 112 is located on a substrate holder 114, such as a conveyer belt and/or a series of transport rollers, so as to convey the substrate underneath the sputtering target 104 preferably so that an entire surface of the substrate 112 is coated when the sputtering apparatus is operated.

The substrate 112 can be a large-area substrate, for example, a large-area glass sheet. The claimed invention, however, is not limited to use with glass.

A variety of well-known glass types can be used, such as soda-lime glass, borosilicate glass, or aluminosilicate glass. In some cases, it may be desirable to use "white glass," a low iron glass, etc. For some applications, it may be desirable to use tinted glass. Moreover, there may be applications where it is desirable to use extremely thin, flexible glass, such as glass sold under the trademark Willow glass by Corning Inc. (Corning, New York, USA). Further, it may be desirable in some cases to use chemically strengthened glass, such as glass sold under the trademark Gorilla glass by Corning Inc.

Glass panes of various sizes can be coated with the equipment and methods of the present invention. Commonly, large-area glass panes are used. Certain embodiments involve glass panes having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters.

In addition, glass panes of various thicknesses can be coated with the equipment and methods of the invention. In some embodiments, glass panes with a thickness of about 1-8 mm are coated. Certain embodiments involve glass panes with a thickness of between about 2.3 mm and about 4.8 mm, and perhaps more preferably between about 2.5 mm and about 4.8 mm. In one particular embodiment, panes of glass (e.g., soda-lime glass) with a thickness of about 3 mm are used.

In alternative embodiments, the equipment and methods of the invention are used to coat panes formed of a polymer, such as polycarbonate, acrylic, or PVC. Various other polymers (e.g., transparent polymers) can be used.

Figure 2:
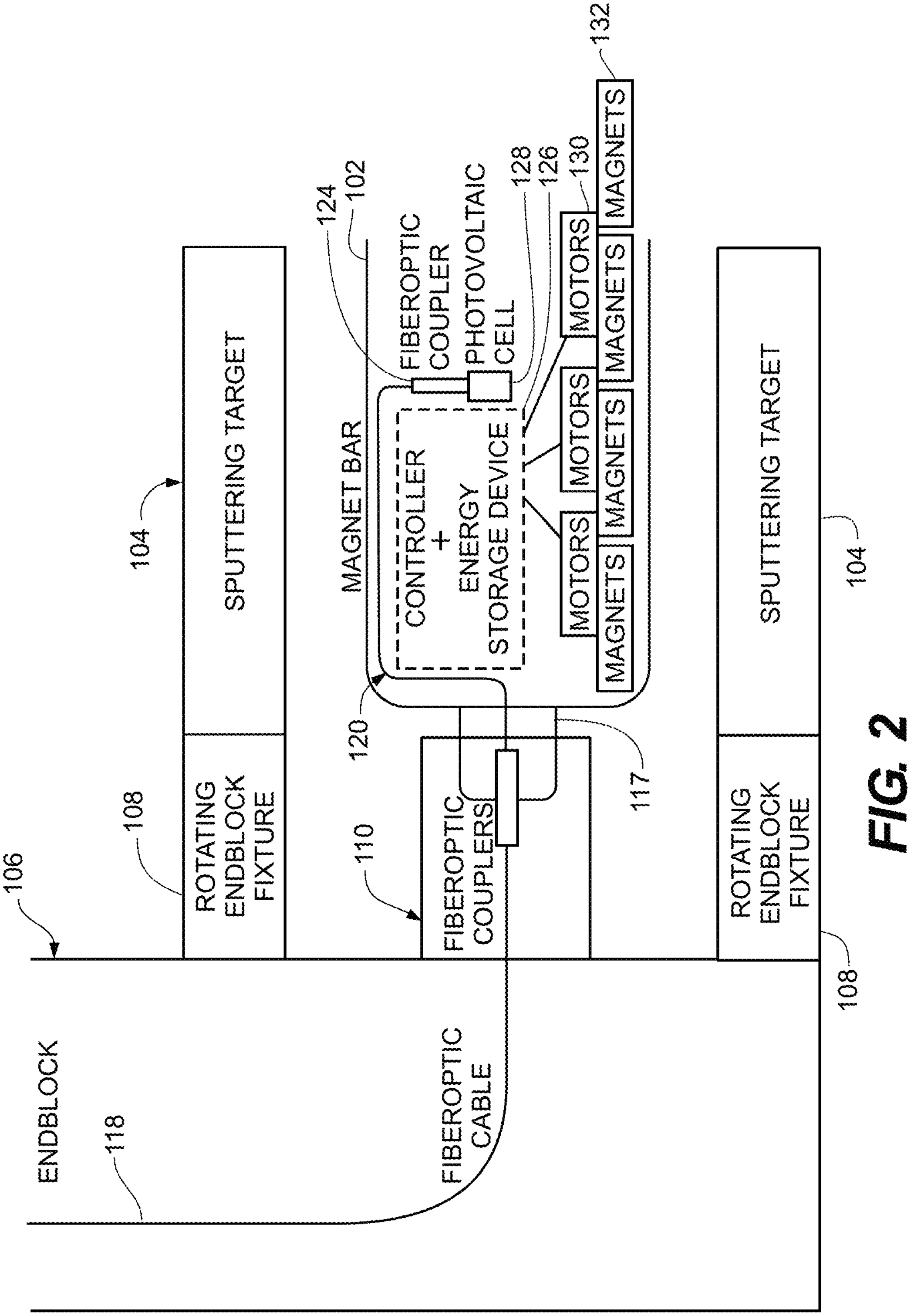
FIG. 2 is an enlarged schematic view of a portion of the sputtering apparatus shown in FIG. 1 according to an embodiment of the invention.

FIG. 2 is an enlarged schematic view of a portion of the sputtering apparatus shown in FIG. 1 shown in greater detail. Only one end portion of the sputtering target 104 and magnetron assembly 102 are shown as well as one end block 106 for clarity purposes. If two end blocks are being used to support the sputtering target 104 and the magnetron assembly 102, only one of them needs to have the embodiment shown in FIG. 2. As previously mentioned, the end block 106 includes a rotating end block fixture 108 and a stationary end block fixture 110. The sputtering target 104 is detachably coupled to the rotating end block fixture 108, and the magnetron assembly is detachably coupled to the stationary end block fixture 110. By virtue of such connections, the sputtering target 104 can rotate around the magnetron assembly 102 while the magnetron assembly 102 remains stationary as is well known.

The magnetron assembly 102 has located therein a plurality of magnets 132, a plurality of motors 130, a controller and energy storage device 126, and a photovoltaic cell 128. The controller and energy storage device 126 will be described in further detail with reference to FIGS. 4 and 5. The controller and energy storage device 126 is operatively coupled to the photovoltaic cell 128 and the plurality of motors 130. The plurality of motors 130 are operatively coupled to the plurality of magnets 132. In a preferred embodiment, a unique motor 130 is operatively coupled to a unique magnet 132 but the embodiments of the invention are not so limited. In such cases, all the motors 130 may be operatively coupled to respective magnets 132, such that there are the same number of motors 130 and magnets 132 and each motor 130 is configured to only move a respective one of the magnets 132. The controller and energy storage device 126, the plurality of motors 130 and the plurality of magnets 132 may be arranged in the magnetron assembly in known ways such as that shown in U.S. Published Application No. 2014/0246312 which is hereby fully incorporated herein by reference, for example. As will be described in detail hereinafter, the magnets 132 are directed by the motors 130 to move or adjust position as desired based on the erosion of the sputtering target 104 over time.

Also located in the magnetron assembly 102 is a fiber optic cable 120. The fiber optic cable 120 extends from an end of the magnetron assembly 102, which will be described in further detail hereinafter with reference to FIG. 3, and is operatively coupled to the photovoltaic cell 128 by a fiber optic coupler 124.

Located preferably in the end block 106 is a second fiber optic cable 118 that comes from outside the sputtering chamber 101. The second fiber optic cable 118 extends into the stationary end block fixture 110. When the magnetron assembly 102 is coupled to the end block 106, the fiber optic cable 120 located in the magnetron assembly 102 and the second fiber optic cable 118 located in the end block 106 are operatively coupled to one another as will be described with reference to FIG. 3.

Figure 3:
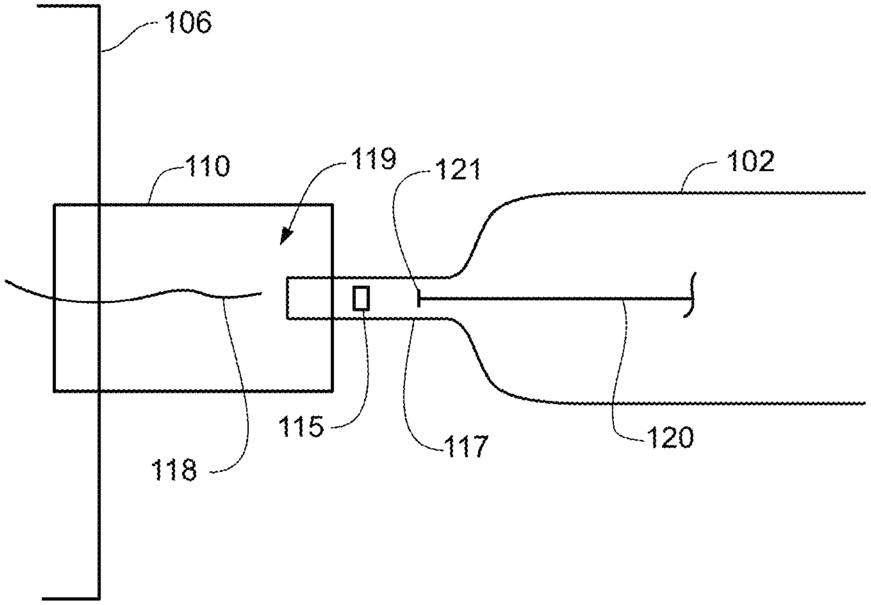
FIG. 3 is a schematic view of a portion of an end coupler and magnetron assembly shown in FIG. 2.

FIG. 3 is a schematic view of a portion of the stationary end block fixture 110 and magnetron assembly 102 shown in FIG. 2 shown in greater detail. The magnetron assembly 102 has a magnetron assembly coupling member 117 located at one end that engages the stationary end block fixture 110 of end block 106 as is well known. The fiber optic cable 120 located in the magnetron assembly 102 has a second end 121 that terminates in the magnetron assembly coupling member 117. The second fiber optic cable 118 has a first end 119 that terminates in the stationary end block fixture 110. In one embodiment, a window 115 is located in the magnetron assembly coupling member 117. For example, the window 115 can be located in an end cap (not shown) of the magnetron assembly as is well known. A second end 121 of the fiber optic cable 120 and the first end 119 of the second fiber optic cable 118 are in sufficient proximity and alignment with each other to effectively communicate with each other through the window 115 as is well known in the art. Alternatively, an optical transceiver (not shown) may be used instead of the window 115 and the first and second ends 119, 121 of the fiber optic cable 120 and the second fiber optic cable 118 are coupled together through the optical transceiver.

The controller and energy storage device 126 as shown in FIG. 2 preferably includes an electronic controller 127 and a rechargeable battery 129, respectively. Preferably, the rechargeable battery 129 provides power to the electronic controller 127 as well as the plurality of motors 130.

FIGS. 4-7 are block diagrams illustrating embodiments of the controller and energy storage device 126 as they are operatively coupled to the photovoltaic cell 128 and the plurality of motors 130 and cable 120 in the magnetron assembly 102.

Figure 4:
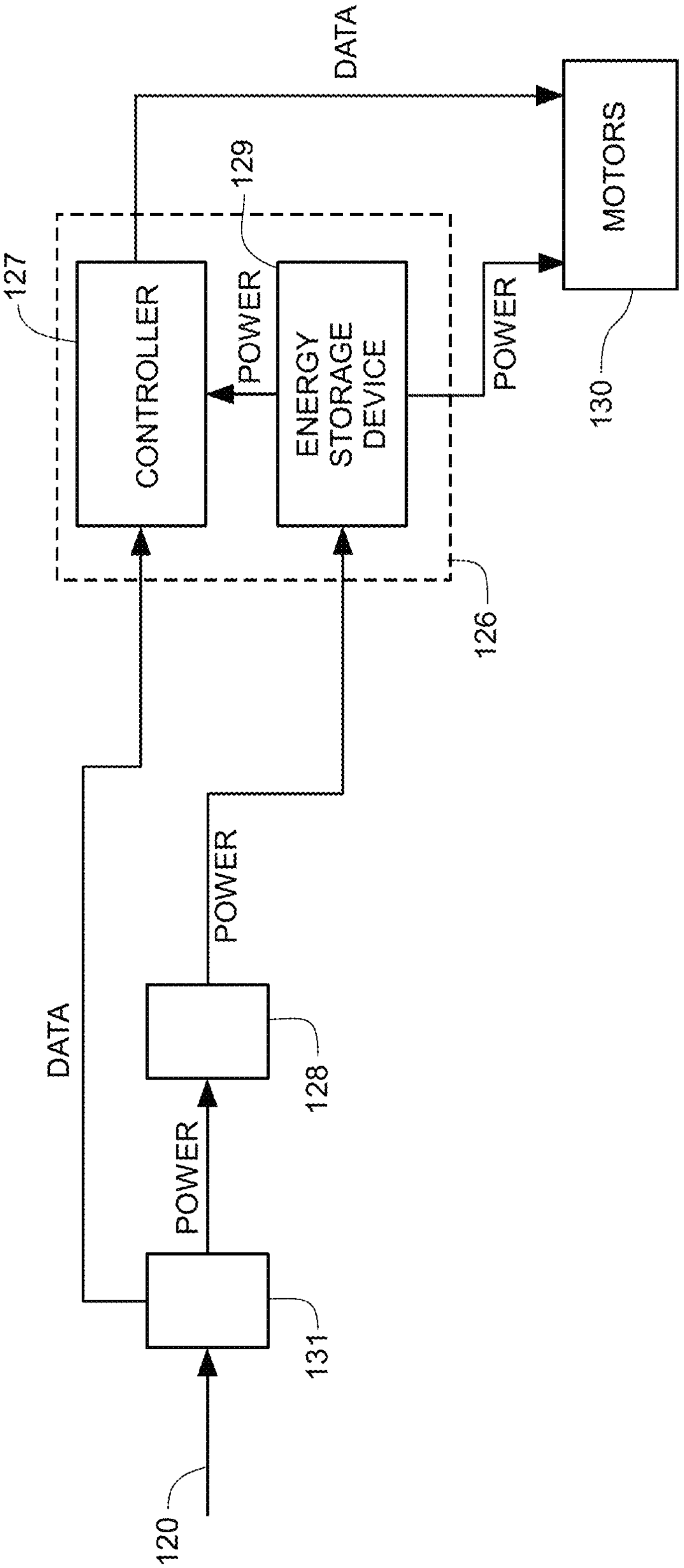
FIG. 4 is a block diagram illustrating connections of components located in a magnetron assembly according to an embodiment of the invention.

FIG. 4 is a block diagram illustrating the connections of components located in the magnetron assembly according to an embodiment of the invention. A splitter 131 receives power and data signals through fiber optic cable 120 from the second fiber optic cable 118 located in the end block 106. The power and data signals are delivered by the fiber optic cable 120 as photons and are split by the splitter 131 into a power signal and a data signal. The power signal is delivered to the photovoltaic cell 128 where it is converted into electrical signals. The data signal is delivered to an optical communication transceiver (not shown) and then delivered to the electronic controller 127. The controller and energy storage device 126 includes an electronic controller 127 and a rechargeable battery 129, for example. Other types of storage devices may be used. In FIG. 4, the electronic controller 127 and rechargeable battery 129 are shown as separate devices whereas in FIG. 5 they are shown as one device. The electronic controller 127 is operatively coupled to the splitter 126 to receive electrical data signals. The rechargeable battery 129 is operatively coupled to the photovoltaic cell 128 to receive electrical power signals that can be used to charge the rechargeable battery preferably using a trickle charging technique. The rechargeable battery 129 is operatively coupled to the electronic controller 127 to provide power to the electronic controller 127. The rechargeable battery 129 is also operatively coupled to the plurality of motors 130 (schematically shown as one motor for clarity purposes) to deliver power signals to the plurality of motors 130. The electronic controller 127 is operatively coupled to the plurality of motors 130 to deliver data signals to the plurality of motors 130 to activate at least one of the plurality of motors 130 to adjust the position of at least one of the plurality of magnets 132 according to the data signals.

Figure 5:
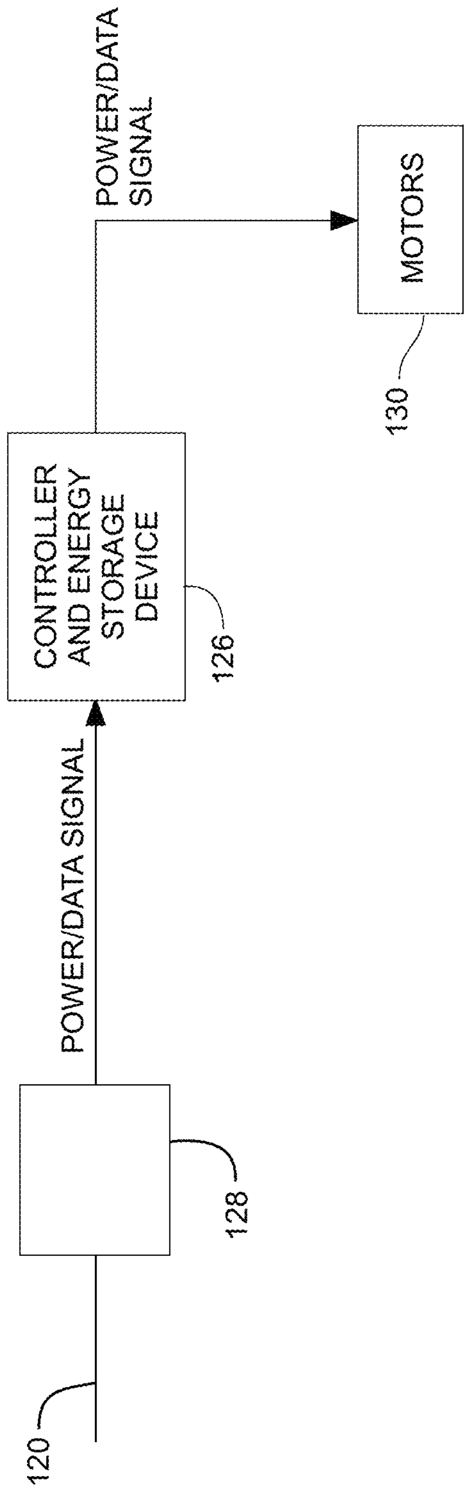
FIG. 5 is a block diagram illustrating connections of components located in a magnetron assembly according to another embodiment of the invention.

FIG. 5 is a block diagram illustrating the connections of components located in the magnetron assembly according to another embodiment of the invention where the electronic controller and rechargeable battery are shown as one module 126. The operation of the components in FIG. 5 is similar to that shown in FIG. 4 with the exception that the power and data signals are combined and carried together from the photovoltaic cell 128 instead of being split into power and data signals. The power and data signals are converted by the photovoltaic cell 128 to electrical signals to supply the power and data signals appropriately.

Figure 6:
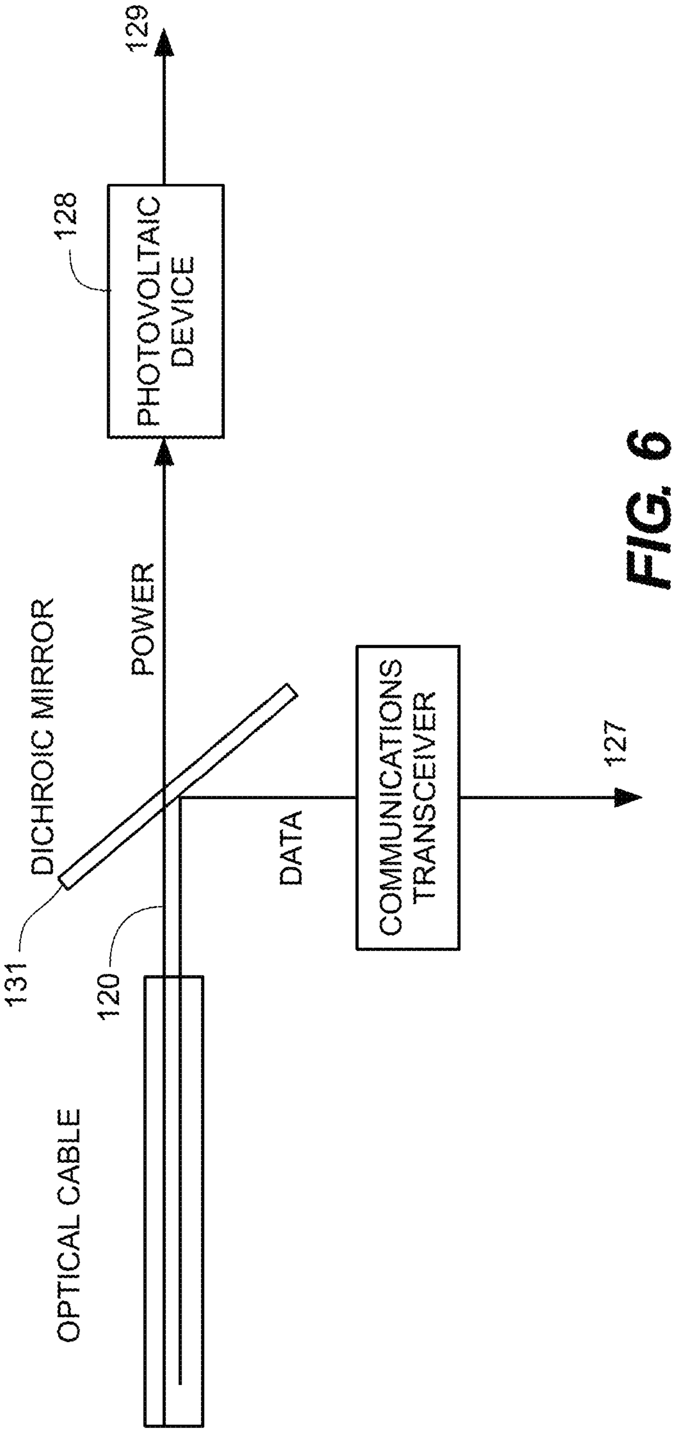
FIG. 6 is a block diagram illustration a portion of the components located in the magnetron assembly according to an embodiment of the invention.

FIG. 6 is a block diagram illustration a portion of the components located in the magnetron assembly according to an embodiment of the invention. The light photons received from the fiber optic cable 120 are sent to a splitter 131 which in this embodiment is a dichroic mirror. The splitter 131 splits the photon beam containing the power signals into a power signal and directs that to the photovoltaic device 128. Those photon signals containing the data signals are split into a data signal and sent to a communications transceiver and then the electronic controller 127.

Figure 7:
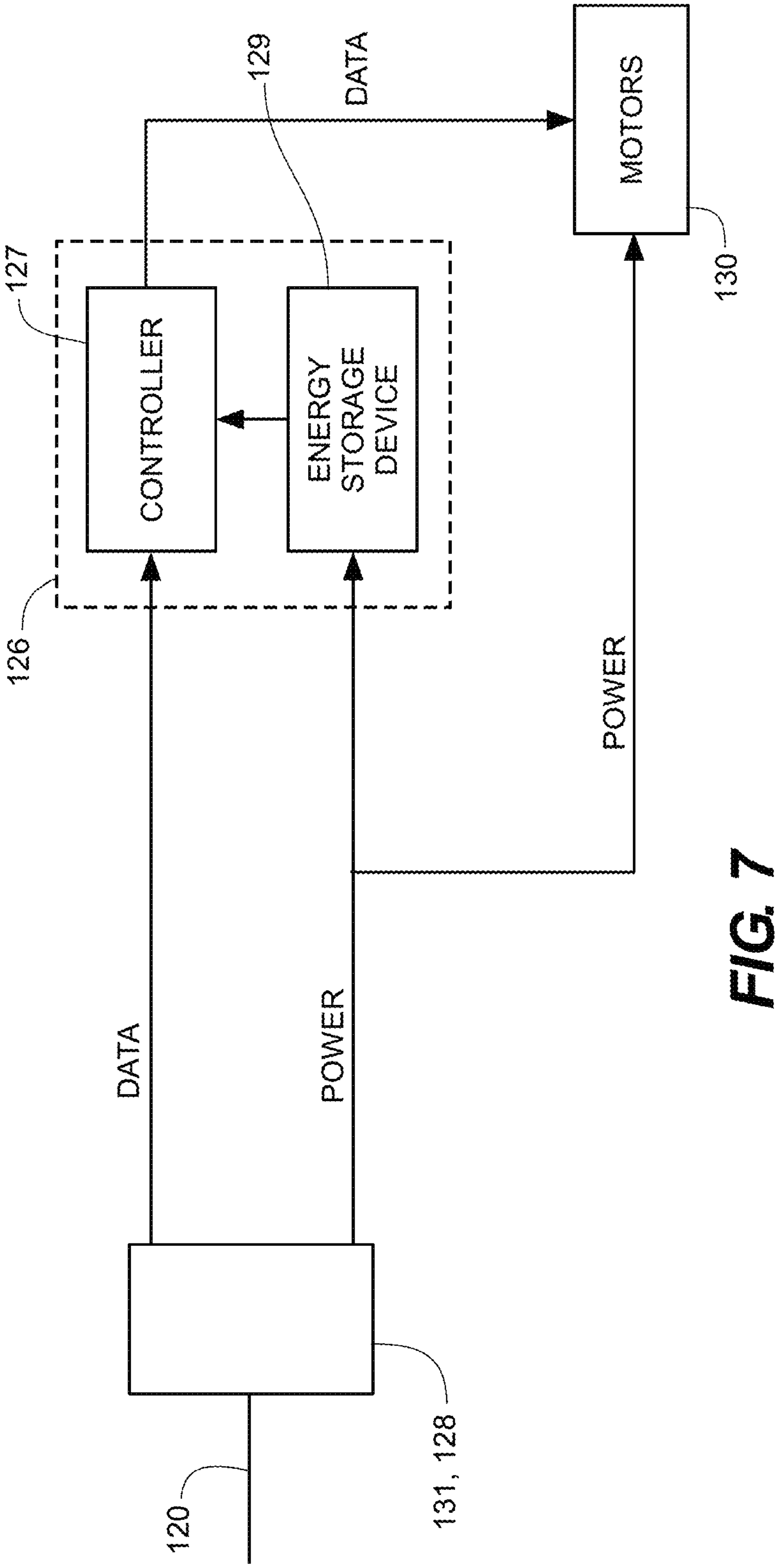
FIG. 7 is a block diagram illustrating connections of components located in a magnetron assembly according to another embodiment of the invention.

FIG. 7 is a block diagram illustrating connections of components located in a magnetron assembly according to another embodiment of the invention. The operation of the components in FIG. 7 is similar to that shown in FIGS. 4 and 5 with the exception that the photovoltaic cell and the splitter are combined.

By providing the ability to recharge the battery using power signals delivered by a fiber optic system, unproductive down time of the sputtering apparatus is reduced contrary to systems that require dismantling of the sputtering apparatus to recharge batteries located in the magnetron assembly or replace them.

It is known to use battery packs for driving motors used to adjust the positions of magnets in a magnetron assembly. As battery packs hold a finite amount of energy, the number of adjustments made to the magnets is limited before the batteries need to be recharged and eventually replaced. The rechargeable battery of the embodiments of the invention may be in the form of a rechargeable lithium ion battery pack or packs located along the length of the magnetron assembly.

In a preferred embodiment, fiber optic cables are used. The fiber optic cable is preferably a multimode cable. Alternatively, a liquid light guide may be used. The liquid light guide is a broadband fiber that is larger in diameter than the glass or plastic fiber optic cables. Because of its larger size, a bigger power signal may be transmitted to power the actuators and sensors in addition to trickle charging the rechargeable battery or energy source.

While the embodiments of the invention have been described with rotary targets, the claimed invention may also be used with planar targets.

While some preferred embodiments of the invention have been described, it should be understood that various changes, adaptations and modifications may be made therein without departing from the spirit of the invention and the scope of the appended claims.

What is claimed is:

1. A magnetron sputtering apparatus comprising two end blocks and a rotary cathode assembly mounted between the two end blocks, the rotary cathode assembly comprising:

(i) a magnetron assembly comprising:

a plurality of magnets;

a plurality of motors operatively coupled to the plurality of magnets, the plurality of motors configured to adjust positions of the plurality of magnets;

a controller and energy storage device in operative communication with the plurality of motors, the controller and energy storage device including an electronic controller and at least one rechargeable battery; and a fiber optic cable operatively coupled to the controller and energy storage device such that photon signals received by the fiber optic cable from outside the magnetron assembly are converted to electrical signals and delivered to the controller and energy storage device wherein the electrical signals include power signals to recharge the rechargeable battery by trickle charging, such that the rechargeable battery is maintained substantially in a full power state;

(ii) a rotary target, the rotary target being a hollow cylindrical target surrounding the magnetron assembly:

each of the two end blocks having both a rotatable end block fixture and a stationary end block fixture, such that there are two rotatable end block fixtures and two stationary end block fixtures, the hollow cylindrical target rotatably attached to the two rotatable end block fixtures, and the magnetron assembly stationarily attached to the two stationary end block fixtures, the fiber optic cable extending through an interior of the magnetron assembly and having an end adjacent to the stationary end block fixture of one of the two end blocks, and the magnetron sputtering apparatus further comprising a second fiber optic cable that is located outside the rotary cathode assembly and extends through said one of the two end blocks to a first end that terminates in the stationary end block fixture of said one of the two end blocks, the fiber optic cable of the magnetron assembly being optically coupled to the second fiber optic cable, such that the second fiber optic cable is configured to deliver the photon signals to the fiber optic cable of the magnetron assembly.

2. The magnetron sputtering apparatus of claim 1 wherein the electrical signals delivered to the controller and energy storage device include data signals that the electronic controller in the controller and energy storage device uses to activate the plurality of motors to adjust positions of the plurality of magnets.

3. The magnetron sputtering apparatus of claim 1 wherein the rechargeable battery in the controller and energy storage device powers the electronic controller.

4. The magnetron sputtering apparatus of claim 1 wherein the rechargeable battery in the controller and energy storage device powers the plurality of motors.

5. The magnetron sputtering apparatus of claim 1 wherein the magnetron assembly has an end cap including a window that allows the photon signals transmitted from outside the magnetron assembly to be directed to the fiber optic cable of the magnetron assembly.

6. The magnetron sputtering apparatus of claim 1 further comprising a photovoltaic cell operatively coupled to the fiber optic cable and the control and energy storage device, the photovoltaic cell configured to convert the photon signals received by the fiber optic cable into the electrical signals.

7. The magnetron sputtering apparatus of claim 6 further comprising an optical transceiver located in the magnetron assembly, wherein the optical transceiver operatively couples the fiber optic cable to the photovoltaic cell.

8. The magnetron sputtering apparatus of claim 2 wherein the plurality of motors are configured to adjust positions of the plurality of magnets with respect to an inner surface of the hollow cylindrical target in response to the data signals received by the controller and energy storage device.

9. The magnetron sputtering apparatus of claim 1 wherein as the hollow cylindrical target erodes during operation of the magnetron sputtering apparatus, the plurality of motors adjust positions of the plurality of magnets with respect to an inner surface of the hollow cylindrical target in response to the photon signals delivered to the controller and energy storage device.

10. The magnetron sputtering apparatus of claim 1 further comprising a window or fiber optic coupler, the window or fiber optic coupler located in the stationary end block fixture of said one of the two end blocks such that the fiber optic cable of the magnetron assembly and the second fiber optic cable can communicate with each other.

11. A method for displacing at least one of a plurality of magnets located in a magnetron assembly for sputtering with a magnetron sputtering apparatus, the magnetron sputtering apparatus comprising two end blocks, the magnetron assembly comprising a plurality of motors operatively coupled to the plurality of magnets, the plurality of motors configured to adjust positions of the plurality of magnets, a controller and energy storage device in operative communication with the plurality of motors, the controller and energy storage device including an electronic controller and at least one rechargeable battery, a fiber optic cable operatively coupled with the controller and energy storage device, the magnetron sputtering apparatus comprising a rotary cathode assembly that includes the magnetron assembly and a rotary target, the rotary target being a hollow cylindrical target surrounding the magnetron assembly, each of the two end blocks having both a rotatable end block fixture and a stationary end block fixture, such that there are two rotatable end block fixtures and two stationary end block fixtures, the hollow cylindrical target rotatably attached to the two rotatable end block fixtures, and the magnetron assembly stationarily attached to the two stationary end block fixtures, the fiber optic cable extending through an interior of the magnetron assembly and having an end adjacent to the stationary end block fixture of one of the two end blocks, the method comprising the steps of:

delivering photon signals from outside the magnetron to the fiber optic cable assembly and converting the photon signals to electrical signals delivered to the controller and energy storage device, wherein the photon signals include power signals; and recharging the rechargeable battery of the controller and energy storage device with the power signals by trickle charging the rechargeable battery, such that the rechargeable battery is maintained substantially in a full power state.

12. The method of claim 11 wherein the photon signals include data signals and the method further includes the step of activating the motors to adjust the positions of the plurality of magnets according to the data signals.

13. The method of claim 11 wherein the photon signals delivered to the fiber optic cable of the magnetron assembly include data signals that configure the plurality of motors to adjust positions of the plurality of magnets closer to an inner surface of the hollow cylindrical target.

14. The method of claim 11 wherein the method further comprises the step of sputtering the hollow cylindrical target while rotating the hollow cylindrical target about the magnetron assembly.

* * * * *